(12) United States Patent
Miyata

(10) Patent No.: US 8,081,315 B2
(45) Date of Patent: Dec. 20, 2011

(54) DISPLACEMENT MEASURING INSTRUMENT AND DISPLACEMENT MEASURING METHOD

(75) Inventor: Kaoru Miyata, Tsukuba (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 383 days.

(21) Appl. No.: 12/458,828

(22) Filed: Jul. 23, 2009

(65) Prior Publication Data
US 2010/0027026 A1    Feb. 4, 2010

(30) Foreign Application Priority Data

Aug. 1, 2008    (JP) ................. 2008-200023

(51) Int. Cl.
*G01B 9/02*    (2006.01)
(52) U.S. Cl. ..................................... 356/493
(58) Field of Classification Search ........... 356/487.498, 356/500, 482, 486
See application file for complete search history.

(56) References Cited

U.S. PATENT DOCUMENTS

| | | | | |
|---|---|---|---|---|
| 5,838,485 A | * | 11/1998 | de Groot et al. | 356/484 |
| 5,991,033 A | * | 11/1999 | Henshaw et al. | 356/487 |
| 7,864,332 B2 | * | 1/2011 | Chou | 356/487 |

FOREIGN PATENT DOCUMENTS

| | | |
|---|---|---|
| JP | A-5-272913 | 10/1993 |
| JP | A-7-49207 | 2/1995 |

OTHER PUBLICATIONS

Banh Quoc et al., "Development of laser interferometer with picometer resolution using frequency tunable laser—The 5$^{th}$ report: Compensation of the displacement measurement due to the fluctuation of the air refractive index-", collected papers for spring lecture of the Japan Society for Precision Engineering, 2008, pp. 441-442, vol. F—No. 02.

Ciddor, "Refractive index of air: new equations for the visible and near infrared," Applied Optics, 1996, pp. 1566-1573, vol. 35—No. 9.

Hatsuzawa et al., "Precise Measurements of Micro-linewidths by using a Micro-Interferometer and a Scanning Electron Microscope," 1994, pp. 1582-1585, vol. 60—No. 11 (with Abstract).

* cited by examiner

*Primary Examiner* — Hwa Lee
(74) *Attorney, Agent, or Firm* — Oliff & Berridge, PLC

(57) ABSTRACT

A laser interferometric measuring instrument includes: a light source that emits a laser beam of 1064 nm and another laser beam of 532 nm; a polarizing beam splitter; a dichroic mirror that splits a long-wavelength laser beam provided in a measurement optical path; a long-wavelength corner cube that reflects the split laser beam; a measurement corner cube that is displaceable along the measurement optical path; a reference corner cube that is displaceable along a reference optical path; a optical path changing unit that changes an optical path length of the long-wavelength laser beam; a phase detector that outputs interference signals; a sum signal computer that calculates a sum signal; a displacement controller that displaces the reference corner cube so as not to change a phase of the sum signal; a reference displacement detector that detects a displacement of the reference corner cube; and a measurement displacement computer that calculates a displacement of the measurement corner cube.

3 Claims, 11 Drawing Sheets

FIG.6

| MEASUREMENT ENVIRONMENTAL FACTOR | STANDARD VALUE | VARIATION RANGE |
|---|---|---|
| TEMPERATURE | 20.0°C | 19.5~20.5°C |
| ATMOSPHERIC PRESSURE | 101300Pa | 96000~105000Pa |
| HUMIDITY | 50% | 40~60% |
| $CO_2$ CONCENTRATION | 450ppm | 300~600ppm |

# DISPLACEMENT MEASURING INSTRUMENT AND DISPLACEMENT MEASURING METHOD

The entire disclosure of Japanese Patent Application No. 2008-200023, filed Aug. 1, 2008, is expressly incorporated by reference herein.

BACKGROUND OF THE INVENTION

1. Field of the Invention

The present invention relates to a displacement measuring instrument and a displacement measuring method of measuring a displacement of an object.

2. Description of Related Art

A laser interferometer capable of setting alignment freely and reducing Abbe errors as compared to a solid scale has been typically known (for instance, see Document 1: JP-A-5-272913).

In the laser interferometer disclosed in Document 1, 1.06 μm YAG laser and its second harmonic are emitted from a light source to be incident on a beam splitter after their polarization states are adjusted by a half-wave plate. A laser beam reflected by the beam splitter is reflected by a reference mirror and a laser beam passed through the beam splitter is reflected by a probe mirror, so that these reflected beams are incident on the beam splitter again to interfere with each other. Then, the interference fringes of the laser beams are split and signals corresponding to the interference fringes are detected, so that geometric lengths are calculated.

When such a laser interferometer as disclosed in Document 1 is used, nonnegligible interpolation errors occur in a small measurement range of few micrometers. Accordingly, it is difficult to measure an object with sub-nanometer accuracy. Thus, a method for shortening a wavelength of a laser beam, a method for amplifying an optical path length by reciprocating a laser beam more frequently between a laser interferometer and a moving reflector to be measured (for instance, Document 2: Takeshi Hatsuzawa, Kouji Toyoda, Yoshihisa Tanimura, Makoto Nara, Syuuji Toyonaga, Shin-ya Hara, Hirotaka Iwasaki, and Kazuhiko Kondou, "Precise Measurements of Micro-linewidths by using a Micro-Interferometer and a Scanning Electron Microscope", Journal of the Japan Society for Precision Engineering, Vol. 60, No. 11 (November, 1994), pp. 1582-1585), and a method for using a wavelength variable laser (for instance, Document 3: Tuan BANH QUOC, Yuuta HOSHINO, Masashi ISHIGE, Takeshi KOBAYASHI, and Masato AKETAGAWA, "Development of laser interferometer with picometer resolution using frequency tunable laser—The 5th report: Compensation of the displacement measurement due to the fluctuation of the air refractive index—", collected papers for spring lecture of the Japan Society for Precision Engineering 2008, F02, pp. 441-442) have been used.

According to the method as disclosed in Document 2, a laser beam is reflected by prisms facing each other so that the laser beam is reciprocated five times between the prisms. Thus, the laser beam has resolution that is optically ten times as high as typical laser beam.

According to the method as disclosed in Document 3, a wavelength is varied using a wavelength variable laser during the measurement, so that the measurement can be conducted without interpolation errors.

When the above-described method of shortening the wavelength of laser beam is employed for enhancing resolution and accuracy of the laser interferometer, the resolution can be enhanced and interpolation errors can be reduced. However, stability of a light source and availability and safety of optical components are reduced when light in an ultraviolet region or an X-ray region having a wavelength shorter than that in a visible range is used, and the instrument is enlarged.

When the method of amplifying an optical path length as disclosed in Document 2 is employed, the wavelength of the laser beam is visually shortened, thereby enhancing accuracy. However, an optical system becomes complicated and light quantity is reduced because of the amplified optical path length. Further, maximum moving speed for measurement is decelerated.

According to the method of using a wavelength variable laser as disclosed in Document 3, a laser beam is dispersed in optical components because the wavelength is dynamically varied during the measurement. Further, high stability of the wavelength is hardly obtained.

Thus, it is difficult for a laser interferometer having a simple arrangement to enhance sub-nanometer measurement accuracy in a narrow measurement range of a few micrometers.

SUMMARY OF THE INVENTION

In view of the above, an object of the invention is to provide a displacement measuring instrument and a displacement measuring method capable of simply and accurately measuring a displacement of an object in a narrow range.

A displacement measuring instrument according to an aspect of the invention includes: a light source that emits two laser beams of different wavelengths having a multiple relationship; a polarization splitter that splits the laser beams emitted from the light source depending on polarizing directions of the laser beams so that one of split laser beams is irradiated to a measurement optical path in a direction toward a target object and the other of the split laser beams is irradiated to a reference optical path in a direction different from the direction of the measurement optical path; a measurement light splitter provided in the measurement optical path to reflect a long-wavelength laser beam out of the two laser beams having different wavelengths and transmit a short-wavelength laser beam out of the two laser beams; a long-wavelength reflector provided in the measurement optical path to reflect the long-wavelength laser beam split by the measurement light splitter; a measurement optical path length changing unit provided in the measurement optical path to change an optical path length of the long-wavelength laser beam; a measurement reflector that is fixed to the target object and displaceable along the measurement optical path to reflect the short-wavelength laser beam; a reference reflector that is displaceable in the reference optical path to reflect the laser beam; a reference optical path length changing unit provided in the reference optical path to change the optical path length of the long-wavelength laser beam; a light superposing unit that superposes the laser beams reflected by the measurement reflector and the long-wavelength reflector in the measurement optical path on the laser beam reflected by the reference reflector in the reference optical path; a detector that receives interference waves generated from the laser beams superposed by the light superposing unit and outputs interference signals corresponding to the received interference waves; a sum signal computer that calculates a sum signal of the interference signal corresponding to the long-wavelength laser beam and the interference signal corresponding to the short-wavelength laser beam out of the interference signals outputted from the detector; a displacement controller that displaces the reference reflector so as not to change a phase of the sum signal; a reference displacement detector that detects a displacement of the reference reflector; and a measurement displacement computer that calculates a displacement of the measurement reflector based on the displacement of the reference reflector.

A displacement measuring method according to another aspect of the invention is used in a displacement measuring instrument including: a light source that emits two laser beams of different wavelengths having a multiple relationship; a polarization splitter that splits the laser beams emitted from the light source depending on polarizing directions of the laser beams so that one of split laser beams is irradiated to a measurement optical path in a direction toward a target object and the other of the split laser beams is irradiated to a reference optical path in a direction different from the direction of the measurement optical path; a measurement light splitter provided in the measurement optical path to reflect a long-wavelength laser beam and transmit a short-wavelength laser beam out of the two laser beams having difference wavelengths; a long-wavelength reflector provided in the measurement optical path to reflect the long-wavelength laser beam split by the measurement light splitter; a measurement optical path length changing unit provided in the measurement optical path to change an optical path length of the long-wavelength laser beam; a measurement reflector that is fixed to the target object and displaceable along the measurement optical path to reflect the short-wavelength laser beam; a reference reflector that is displaceable in the reference optical path to reflect the laser beam; a reference optical path length changing unit provided in the reference optical path to change an optical path length of the long-wavelength laser beam; a light superposing unit that superposes the laser beams reflected by the measurement reflector and the long-wavelength reflector in the measurement optical path on the laser beam reflected by the reference reflector in the reference optical path; and a detector that receives interference waves generated from the laser beams superposed by the light superposing unit and outputs interference signals corresponding to the received interference waves. The displacement measuring method includes: calculating a sum signal of the interference signal corresponding to the long-wavelength laser beam and the interference signal corresponding to the short-wavelength laser beam out of the interference signals; displacing the reference reflector so as not to change a phase of the sum signal; detecting a displacement of the reference reflector; and calculating a displacement of the measurement reflector based on the displacement of the reference reflector.

According to the above arrangement, the two laser beams of different wavelengths having a multiple relationship (i.e., the wavelength of one of the laser beams is a multiple of the wavelength of the other of the laser beams) are split into the measurement optical path in the direction toward the target object and the reference optical path in the direction different from the direction of the measurement optical path. Here, the polarization splitter may transmit a P-polarized light of the laser beams and reflect a S-polarized light of the laser beams.

Out of the laser beams split into the measurement optical path, the long-wavelength laser beam is split by the measurement light splitter and reflected by the long-wavelength reflector. After the optical path length of the long-wavelength laser beam is changed by the measurement optical path length changing unit, the long-wavelength laser beam is incident on the light superposing unit. The short-wavelength laser beam in the measurement optical path is reflected by the measurement reflector and then incident on the light superposing unit.

On the other hand, out of the laser beams split into the reference optical path, the long-wavelength laser beam is incident on the light superposing unit after the optical path length is changed by the reference optical path length changing unit. Also, the short-wavelength laser beam in the reference optical path is reflected by the reference reflector and incident on the light superposing unit.

Then, the light superposing unit generates the interference waves by superposing the laser beams having the same wavelengths to irradiate the interference waves to the detector.

The detector receives the interference waves to output the interference signal corresponding to the long-wavelength laser beam and the interference signal corresponding to the short-wavelength laser beam.

Subsequently, the sum signal computer calculates the sum signal of the two interference signals and the reference displacement detector displaces the reference reflector so as not to change the phase of the sum signal. Then, the measurement displacement computer calculates the displacement of the measurement reflector based on the displacement of the reference reflector.

In the displacement measuring instrument as described above, the displacements of the interference signals outputted from the detector are represented by the following formulae when the displacement of the reference reflector is denoted by 1. Incidentally, the measurement optical path length changing unit changes an optical path of the long-wavelength laser beam irradiated to the measurement optical path so that the long-wavelength laser beam is reciprocated twice between the polarization splitter and the long-wavelength reflector, and the reference optical path length changing unit changes an optical path of the long-wavelength laser beam irradiated to the reference optical path so that the long-wavelength laser beam is reciprocated twice between the polarization splitter and the reference reflector.

$$y_1 = \cos\left(\frac{4\pi}{\lambda_1}n_1(2l)\right) = \cos\left(\frac{4\pi}{\lambda_2}n_1 l\right) \qquad (1)$$

$$y_2 = \cos\left(\frac{4\pi}{\lambda_2}n_2 l\right) \qquad (2)$$

In the above formulae (1) and (2), i is a suffix for distinguishing the wavelengths. i=1 represents the long-wavelength laser beam and i=2 represents the short-wavelength laser beam. $\lambda_i$ represents a vacuum wavelength of each laser beam, and $\lambda_1$ equals to $2\lambda_2$ according to the aspect of the invention. $n_i$ represents a refractive index of each laser beam.

The refractive index of each laser beam is, for instance, approximately 1 in the air. However, the refractive indexes are slightly different depending on the laser beams in practice. The difference of the refractive indexes in the air is represented by the following formula (3).

$$n2-n1=4.2\times10-6 \qquad (3)$$

The interference signals $y_1$ and $y_2$ of the laser beams represented by the above formulae (1) and (2) are different from each other by the refractive index difference represented by the formula (3).

Here, the sum signal computer calculates the sum signal of the interference signals $y_1$ and $y_2$ as represented by the following formula (4).

$$y_1 + y_2 = \cos\left(\frac{4\pi}{\lambda_2}n_1 1\right) + \cos\left(\frac{4\pi}{\lambda_2}n_2 1\right) \quad (4)$$
$$= 2\cos\left(\frac{2\pi}{\lambda_2}n_1 1 + \frac{2\pi}{\lambda_2}n_2 1\right)\cos\left(\frac{2\pi}{\lambda_2}n_1 1 - \frac{2\pi}{\lambda_2}n_2 1\right)$$
$$= 2\cos\left(\frac{2\pi l}{\lambda_2}(n_1 + n_2)\right)\cos\left(\frac{2\pi l}{\lambda_2}(n_1 - n_2)\right)$$

FIG. 1 shows a variation of the sum signal corresponding to the displacement of the reference reflector. In FIG. 1, the sum signal $y_1+y_2$ is shown in black. In practice, however, the sum signal is a signal wave that oscillates in an extremely short cycle as shown in the enlarged view in FIG. 1.

As represented by the formula (4), the sum signal $y_1+y_2$ is calculated by multiplying a signal component of $\cos(2\pi l(n_1+n_2)/\lambda_2)$ having an extremely short cycle by a signal component of $\cos(2\pi l(n_1-n_2)/\lambda_2)$ having a long cycle. FIG. 2 shows a form signal component A1 connecting crests of the waveform of the sum signal and a signal component A2 ($\cos(2\pi l(n_1-n_2)/\lambda_2)$) having a long cycle in FIG. 1. As shown in FIG. 2, one cycle of a point where the form signal component A1 connecting the crests of the waveform of the sum signal $y_1+y_2$, i.e., a zero-cross point of the form signal component is coincident with a half cycle of the signal component A2 ($\cos(2\pi l(n_1-n_2)/\lambda_2)$) having the long cycle. Accordingly, the form signal component A1 completes one cycle when the displacement l satisfies the following formula (5).

$$\frac{2\pi l}{\lambda_2}(n_2 - n_1) = \pi \quad (5)$$

When the displacement l at this time is denoted by $l_T$, the displacement $l_T$ is obtained by the following formula (6).

$$l_T = \frac{\lambda_2}{2(n_2 - n_1)} \quad (6)$$

The displacement $l_T$ can be calculated by the difference of the refractive indexes of the two laser beams and the wavelength of the short-wavelength laser beam.

On the other hand, if the displacement of the measurement reflector is denoted by D when the target object is scanned, the displacement of the interference signal outputted from the detector is represented by the following formula.

$$y_2 = \cos\left(\frac{4\pi}{\lambda_2}n_2 D\right) \quad (7)$$

Here, the long-wavelength laser beam is split by the measurement light splitter and is not reached to the measurement reflector. The long-wavelength laser beam is reflected by the long-wavelength reflector and is irradiated to the detector so as not to be affected by the displacement of the measurement reflector. Accordingly, the sum signal $y_1+y_2$ of the interference signals depend on the variation of $y_2$.

FIG. 3 shows a variation of the sum signal corresponding to the displacement of the measurement reflector. In FIG. 3, signal waveforms are shown when the phase displacement in the formula (7) is +0, +0.5π, +1.0π, or +1.5π in order from the top.

As shown in FIG. 3, the displacement D of the measurement reflector completes one cycle when the following formula is satisfied.

$$\frac{4\pi}{\lambda_2}n_2 D = 2\pi \quad (8)$$

When the displacement D at this time is denoted by $D_T$, the displacement $D_T$ is obtained by the following formula (9).

$$D_T = \frac{\lambda_2}{2n_2} \quad (9)$$

The variation of the sum signal when the reference reflector in the reference optical path is displaced by $l_T$ is the same as the variation of the sum signal when the measurement reflector in the measurement optical path is displaced by $D_T$. Thus, when a ratio of the displacements $l_T$ and $D_T$ is denoted by K, K is represented by the following formula.

$$K = \frac{D_T}{l_T} = \frac{n_2 - n_1}{n_2} \quad (10)$$

K is a constant (referred to as an environmental factor constant) given by the refractive indexes of the laser beams and is determined by the measurement environmental factors such as temperature, atmospheric pressure, humidity and $CO_2$ concentration. For example, K can be easily calculated by using a thermometer, barometer, hygrometer and $CO_2$ concentration meter.

Further, the following formula is obtained by the above formula (10).

$$D = Kl \quad (11)$$

The displacement l of the reference reflector is in linear relation with the displacement D of the measurement reflector. Thus, the reference reflector is displaced by the displacement controller so as not to change the phase of the sum signal, and the displacement l is detected by the reference displacement detector, so that the displacement D of the measurement reflector can be calculated by the measurement displacement computer based on the above formula (11).

In the above-described displacement measuring instrument and displacement measuring method, K is approximately $4.2\times10^{-6}$ in the air and sufficiently smaller than 1. Thus, even when the displacement D of the measurement reflector is extremely small, the displacement D is converted into the displacement l of the reference reflector to have a large value. By measuring the displacement l of the reference reflector in approximate 10 μm, for instance, the displacement D of the measurement reflector can be accurately measured in picometers. In other words, the displacement measuring instrument of the invention can be provided by a simple arrangement without using an X-ray having a short-wavelength or providing a large instrument including a complicated optical system and expensive optical components. Additionally, because laser beams in a visible region or in a near infrared region can be used, safety of the light source can be ensured. Further, because the light source emits laser beams having predetermined wavelengths, high stability of the wavelengths can be obtained without being affected by the dispersion of the laser beam in the optical components as in the wavelength variable laser. Furthermore, the displacement measurement can be accurately conducted in picometers as described above, thereby enhancing measurement accuracy in a narrow range.

In the displacement measuring instrument according to the aspect of the invention, it is preferable that the reference displacement detector detect the displacement of the reference reflector based on the interference signal corresponding to the long-wavelength laser beam.

According to the above arrangement, the reference displacement detector detects the displacement of the reference reflector based on the interference signal corresponding to the long-wavelength laser beam. Here, the long-wavelength laser beam irradiated to the measurement optical path is split by the measurement light splitter and is reflected by the long-wavelength reflector so as not to reach the measurement reflector. In other words, the displacement l of the reference reflector can be easily and accurately calculated in nanometers using the wavelength $\lambda_1$ of the long-wavelength laser beam and the refractive index $n_1$ of the long-wavelength laser beam based on the above formula (1).

BRIEF DESCRIPTION OF THE DRAWINGS

FIG. 6 shows definitions of environmental factors and their variation ranges.

DETAILED DESCRIPTION OF PREFERRED EMBODIMENT(S)

A laser interferometric measuring instrument will be exemplarily described as a displacement measuring instrument according to an exemplary embodiment of the invention with reference to the attached drawings.

Figure 4:
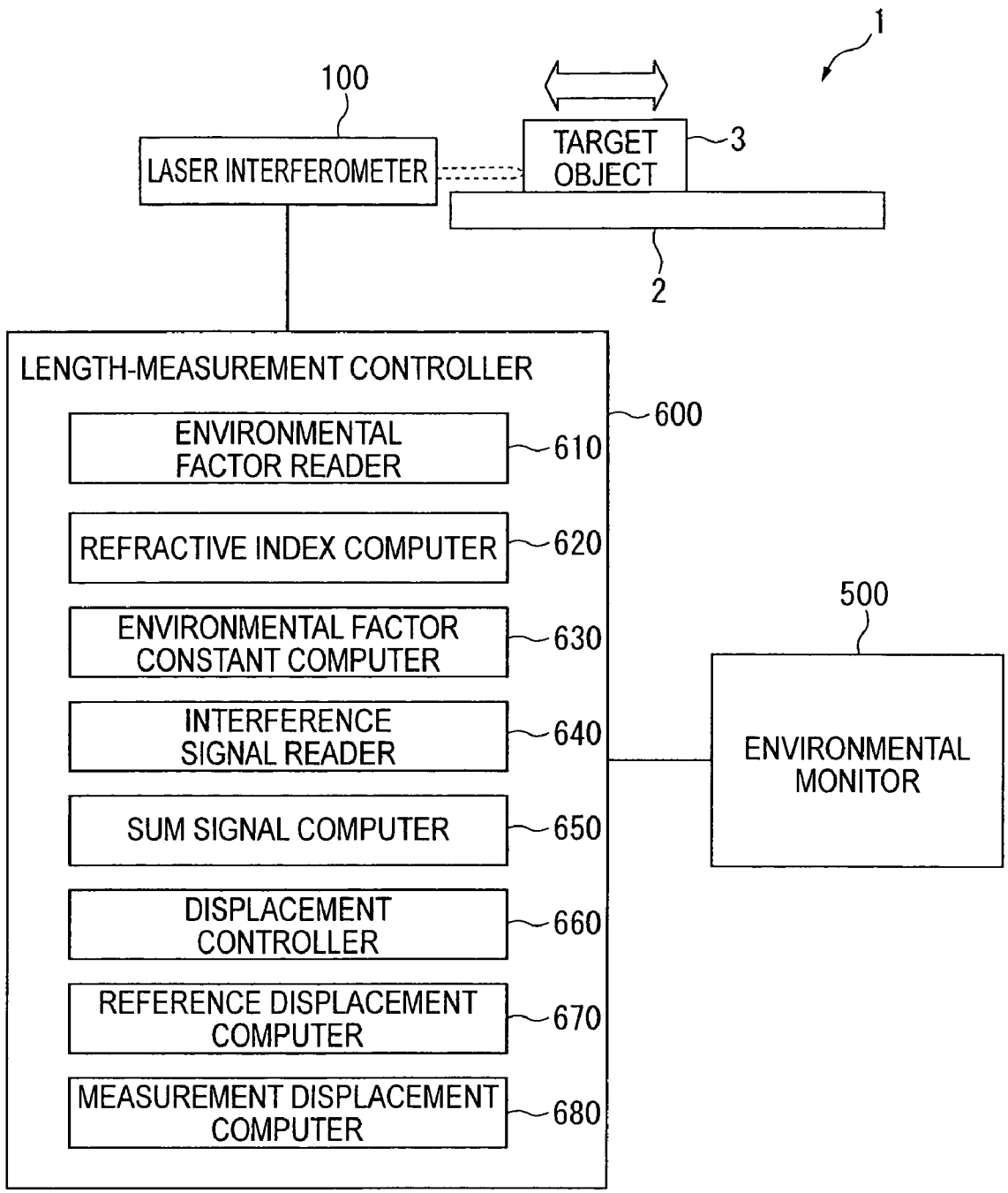
FIG. 4 is a block diagram schematically showing a laser interferometric measuring instrument according to an exemplary embodiment of the invention.

FIG. 4 is a block diagram schematically showing a laser interferometric measuring instrument according to the exemplary embodiment of the invention.

A laser interferometric measuring instrument 1 measures, for example, a displacement D of a target object 3 on a stage 2 as shown in FIG. 4. The laser interferometric measuring instrument 1 is incorporated in a machine tool for producing precision components, a highly accurate measuring instrument, a microscopic profile measuring instrument or the like to accurately measure a displacement of a target object in $10^{-12}$ m. In this exemplary embodiment, the laser interferometric measuring instrument 1 for measuring the displacement of the target object 3 provided on the stage 2 is exemplarily explained. However, the laser interferometric measuring instrument 1 can also be used as a displacement evaluating and calibrating instrument to evaluate and calibrate a capacitive displacement gauge, a digital scale and the like. As shown in FIG. 4, the laser interferometric measuring instrument 1 includes a laser interferometer 100, an environmental monitor 500, and a length-measurement controller 600.

Arrangement of Laser Interferometer

Figure 5:
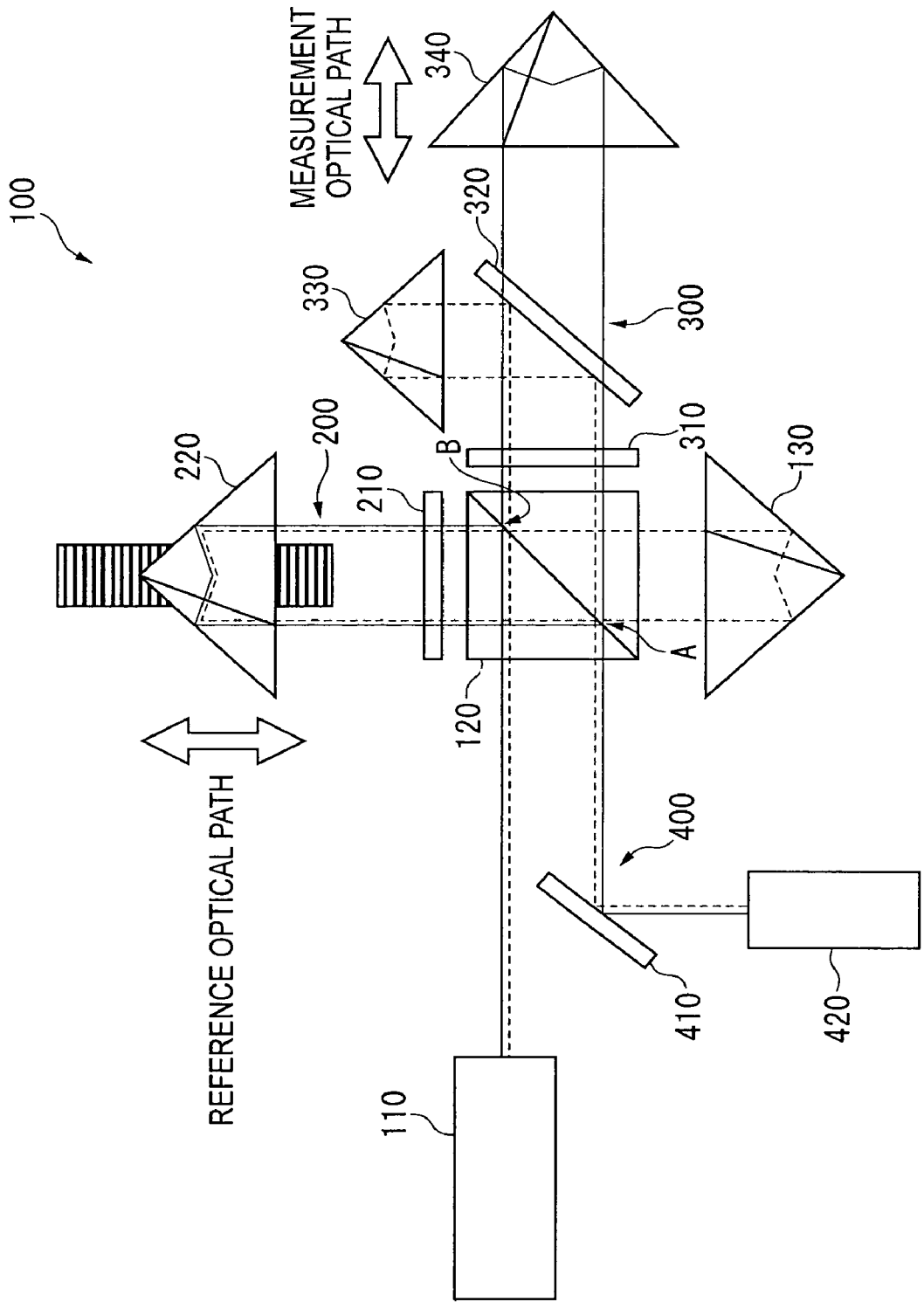
FIG. 5 is a block diagram showing an outline of an optical system of a laser interferometer in the laser interferometric measuring instrument.

FIG. 5 is a block diagram showing an outline of an optical system of the laser interferometer 100 in the laser interferometric measuring instrument 1. In FIG. 5, the dashed line represents an optical path of long-wavelength laser beam and the solid line represents an optical path of short-wavelength laser beam.

As shown in FIG. 5, the laser interferometer 100 includes: a light source 100; a polarizing beam splitter 120 serving as a polarization splitter and light superposing unit; an optical path length changing corner cube 130 serving as a part of a measurement optical path length changing unit and reference optical path length changing unit; a reference optical path 200; a measurement optical path 300; and an interference length measuring optical path 400.

The light source 110 emits a long-wavelength laser beam having 1064 nm wavelength and a short-wavelength laser beam having a half wavelength of the wavelength of the long-wavelength laser beam (i.e., 532 nm wavelength) toward the polarizing beam splitter 120. The light source 110 may be a laser light source that emits the long-wavelength laser beam having 1064 nm wavelength and outputs a second harmonic of the long-wavelength laser beam as the short-wavelength laser beam using a wavelength converter, or may include a laser light source that emits the long-wavelength laser beam and another laser light source that emits the short-wavelength laser beam so as to emit the laser beams having different wavelengths. In this exemplary embodiment, the long-wavelength laser beam having 1064 nm wavelength and the short-wavelength laser beam having 532 nm wavelength are exemplarily described as the laser beams to be emitted. However, two laser beams having other different wavelengths may be emitted as long as the wavelengths have a multiple relationship.

The polarizing beam splitter 120 irradiates the laser beams emitted from the light source 110 to the measurement optical path 300 and reference optical path 200 depending on the polarizing directions of the laser beams. Specifically, the polarizing beam splitter 120 is provided by a plurality of translucent components fitted together, the translucent components having a parallelogram-shaped column in cross section. On boundary surfaces of the translucent components, a polarization split film and a reflective film are alternately provided. The polarization split film splits a S-polarized light and transmits a P-polarized light. The reflective film reflects the S-polarized light.

The laser beams incident on the polarizing beam splitter 120 are split into two linear polarized lights because the S-polarized light is reflected by and the P-polarized light is transmitted through the polarization split film at a point B. The S-polarized light split by the polarization split film is reflected by the reflective film and is irradiated from a first end surface of the polarizing beam splitter 120 adjacent to the reference optical path 200. On the other hand, the S-polarized light transmitted through the polarization split film is irradiated from a second end surface of the polarizing beam splitter 120 adjacent to the measurement optical path 300.

The polarizing beam splitter 120 combines a laser beam incident from the reference optical path 200 and a laser beam incident from the measurement optical path 300, so that the combined laser beam is irradiated to the interference length measuring optical path 400 provided adjacent to the light source 110. More specifically, the polarizing beam splitter 120 reflects the S-polarized light incident from the reference optical path 200 and transmits the P-polarized light incident from the measurement optical path 300. Accordingly, an interference wave is provided by superposing the S-polarized light incident from the reference optical path 200 over the P-polarized light incident from the measurement optical path 300 to be irradiated to the interference length measuring optical path 400.

Here, the P-polarized light incident from the reference optical path 200 is transmitted to be irradiated to the optical path length changing corner cube 130 from an end surface opposite to the first end surface adjacent to the reference optical path 200. Also, the S-polarized light incident from the measurement optical path 300 is reflected by the reflective film and irradiated to the optical path length changing corner cube 130. Further, the P-polarized light incident from the optical path length changing corner cube 130 is transmitted to be irradiated to the reference optical path 200. The S-polarized light incident from the optical path length changing corner cube 130 is reflected by the reflective film and irradiated to the measurement optical path 300.

As shown in FIG. 5, the optical path length changing corner cube 130 is an optical component having a right triangle mirror. The optical path length changing corner cube 130 reflects the laser beam incident from the polarizing beam splitter 120 by three mirror surfaces to irradiate the laser beam to the polarizing beam splitter 120.

The light reflected at a predetermined point (a point A in FIG. 5) in the polarizing beam splitter 120 can be condensed using the optical path length changing corner cube 130; a reference corner cube 220 as described later as a reference reflector; a measurement corner cube 340 as described later as a measurement reflector; and a long-wavelength corner cube 330 as described later as a long-wavelength reflector. Thus, an interference wave can be favorably provided. Also, by providing the interference length measuring optical path 400 on the optical path that passes through the point A, the incident optical path of the laser beam incident from the light source 110 can be separated from the interference length measuring optical path 400 as shown in FIG. 5. Thus, optical components can be disposed on the interference length measuring optical path 400 without interfering with the laser beam passing through the incident optical path. Though the laser beam is reflected by the optical path length changing corner cube 130 in this exemplary embodiment, the laser beam may be reflected by, for instance, a mirror.

The reference corner cube 220 serving as the reference reflector and a quarter-wave plate 210 are disposed in the reference optical path 200. The reference optical path length changing unit of the invention is provided by the quarter-wave plate 210 and the optical path length changing corner cube 130.

The quarter-wave plate 210 is a retarder to effectively work only on the long-wavelength laser beam having 1064 nm wavelength out of the S-polarized light that has passed through the polarizing beam splitter 120. The quarter-wave plate 210 converts the long-wavelength laser beam to a circular polarized light and irradiates the circular polarized light.

Similarly to the optical path length changing corner cube 130, the reference corner cube 220 is an optical component having a right triangle mirror. The reference corner cube 220 reflects the laser beam incident from the polarizing beam splitter 120 by three mirror surfaces to irradiate the laser beam to the polarizing beam splitter 120. At this time, the reference corner cube 220 reflects the laser beam toward the optical path passing through the point A in the polarizing beam splitter 120 as described above.

The reference corner cube 220 is displaceable along the reference optical path 200, and is advanced and retracted in the reference optical path by a driver (not shown). The driver is precisely controlled by the length-measurement controller 600, for example, in $10^{-9}$ m.

The laser beam irradiated to the reference path 200 passes through an optical path as described below.

The long-wavelength laser beam of the S-polarized light irradiated from the polarizing beam splitter 120 is converted into the circular polarized light by the quarter-wave plate 210 to enter the reference corner cube 220. The long-wavelength laser beam is reflected by the reference corner cube 220 to pass through the quarter-wave plate 210 again and enter the polarizing beam splitter 120. At this time, the polarizing direction of the long-wavelength laser is changed by the quarter-wave plate 210. In other words, the long-wavelength laser is converted into the P-polarized light. Subsequently, the long-wavelength laser of the P-polarized light passes through the point A in the polarizing beam splitter 120 to be irradiated from the end surface opposite to the reference optical path 200 and reflected by the optical path length changing corner cube 130. The long-wavelength laser of the P-polarized light enters the polarizing beam splitter 120 again and passes through the point B to enter the reference optical path 200. Then, the long-wavelength laser beam of the P-polarized light is transmitted through the quarter-wave plate 210 to be converted into the circular polarized light and is reflected by the reference corner cube 220. The long-wavelength laser beam passes through the quarter-wave plate 210 again to be converted into the S-polarized light, the polarizing direction of which is changed. Then, the long-wavelength laser of the S-polarized light is incident on the polarizing beam splitter 120 and is reflected by the reflective film at the point A so as to enter the interference length measuring optical path 400. In other words, the long-wavelength is reciprocated twice between the polarizing beam splitter 120 and the reference corner cube 220 by the quarter-wave plate 210 and the optical path length changing corner cube 130.

On the other hand, the short-wavelength laser beam of the S-polarized light irradiated from the polarizing beam splitter 120 is not affected by the quarter-wave plate 210 and is incident on the reference corner cube 220 as the S-polarized light. The short-wavelength laser beam is reflected by the reference corner cube 220 to pass through the quarter-wave plate 210 again and enter the polarizing beam splitter 120. At this time, the short-wavelength laser beam is not affected by the quarter-wave plate 210 and enters the reference corner cube 120 as the S-polarized light. Then, the short-wavelength laser beam is reflected by the reflective film at the point A in the polarizing beam splitter to be irradiated to the interference length measuring optical path 400.

On the measurement optical path 300, a quarter-wave plate 310; a dichroic mirror 320 serving as a measurement light splitter; the long-wavelength corner cube 330 serving as the long-wavelength reflector; and the measurement corner cube 340 serving as the measurement reflector are disposed. Incidentally, the measurement optical path length changing unit of the invention is provided by the quarter-wave plate 310 and the optical path length changing corner cube 130.

Similarly to the quarter-wave plate 210, the quarter-wave plate 310 is a retarder to effectively work only on the long-wavelength laser beam having 1064 mm wavelength out of the laser beam of the P-polarized light that has passed through the polarizing beam splitter 120. The quarter-wave plate 310 converts the long-wavelength laser into the circular polarized light and irradiates the circular polarized light.

The dichroic mirror 320 reflects the long-wavelength laser beam having 1064 mm wavelength and transmits the short-wavelength laser beam having 532 mm wavelength.

The long-wavelength corner cube 330 is an optical component having a right triangle mirror. The long-wavelength corner cube 330 reflects the long-wavelength laser beam reflected by the dichroic mirror 320 using three mirror surfaces and irradiates the long-wavelength laser beam to the dichroic mirror 320. At this time, the long-wavelength corner cube 330 reflects the long-wavelength laser beam so that the long-wavelength laser beam passes through the optical path passing through the point A in the polarizing beam splitter 120 as described above.

The measurement corner cube 340 is an optical component having a right triangle mirror, similarly to the optical path length changing corner cube 130, the reference corner cube 220 and the long-wavelength corner cube 330 as described above. The measurement corner cube 340 reflects the short-wavelength laser beam incident from the polarizing beam splitter 120 by three mirror surfaces and irradiates the short-wavelength laser beam to the polarizing beam splitter 120. At this time, the measurement corner cube 340 reflects the short-wavelength laser beam to the optical path passing through the point A in the polarizing beam splitter 120 as described above.

The laser beam irradiated to the measurement path 300 passes through an optical path as described below.

The long-wavelength laser beam of the P-polarized light irradiated from the polarizing beam splitter 120 is converted into the circular polarized light by the quarter-wave plate 310 and then is reflected by the dichroic mirror 320 to enter the long-wavelength corner cube 330. After being reflected by the long-wavelength corner cube 330, the long-wavelength laser beam is reflected by the dichroic mirror 320 to pass through the quarter-wave plate 310 and enter the polarizing beam splitter 120. At this time, the long-wavelength laser beam is converted by the quarter-wave plate 310 into the S-polarized light, the polarizing direction of which is changed. Subsequently, the long-wavelength laser beam of the S-polarized light is reflected at the point A of the polarizing beam splitter 120 to be irradiated from the end surface opposite to the reference optical path 200 and be reflected by the optical path length changing corner cube 130. Then, the long-wavelength laser beam is incident on the polarizing beam splitter 120 again and is reflected at the point B to be irradiated to the measurement optical path 300. The long-wavelength laser beam of the S-polarized light is converted into circular polarized light by the quarter-wave plate 310, passes through the dichroic mirror 320, and is reflected by the long-wavelength corner cube 330. Then, the circular polarized light is reflected by the dichroic mirror 320 toward the polarizing beam splitter 120 and passes through the quarter-wave plate 310, so that the circular polarized light is converted into the P-polarized light, the polarizing direction of which is changed. Then, the P-polarized light enters the polarizing beam splitter 120 again and passes through the point A to be irradiated to the interference length measuring optical path 400. In other words, the long-wavelength laser beam is reciprocated twice between the polarizing beam splitter 120 and the long-wavelength corer cube 330 by the quarter-wave plate 310, optical path length changing corner cube 130, dichroic mirror 320, and long-wavelength corner cube 330.

On the other hand, the short-wavelength laser beam of the P-polarized laser beam irradiated from the polarizing beam splitter 120 is not affected by the quarter-wave plate 310. The short-wavelength laser beam passes through the dichroic mirror 320 and enters the measurement corner cube 340. The short-wavelength laser beam is reflected by the measurement corner cube 340 to pass through the dichroic mirror 320 and quarter-wave plate 310 and enter the polarizing beam splitter 120. At this time, the short-wavelength laser beam is also not affected by the quarter-wave plate 310. Accordingly, the short-wavelength laser beam enters the polarizing beam splitter 120 as the P-polarized light. The short-wavelength laser beam then passes through the point A in the polarizing beam splitter to enter the interference length measuring optical path 400.

A plane mirror 410 for reflecting the laser beam irradiated from the polarizing beam splitter 120 and a phase detector 420 serving as a detector for receiving the laser beam reflected by the plate mirror 410 are disposed on the interference length measuring optical path 400.

The phase detector 420 receives the two interference waves of the laser beams having different wavelengths superposed by the polarizing beam splitter 120 and outputs interference signals corresponding to the interference waves having different wavelengths to a length-measurement controller 600.

Arrangement of Environmental Monitor

The environmental monitor 500 includes measuring instruments such as a thermometer, barometer, hygrometer, $CO_2$ concentration meter. The environmental monitor 500 measures environmental factors (temperature, atmospheric pressure, humidity, $CO_2$ concentration) required for calculating an air refractive index using these measuring instruments, and outputs measurement values to the length-measurement controller 600. Since the effect of the $CO_2$ concentration is particularly small, the measurement using the $CO_2$ concentration meter is not always necessary and an appropriate fixed value, for example, 450 ppm, may be set.

Arrangement of Length-Measurement Controller

The length-measurement controller 600 is connected to the laser interferometer 100 and calculates displacements of the reference corner cube 220 and measurement corner cube 340 based on the interference signals outputted from the laser interferometer. The length-measurement controller 600 also controls the reference corner cube 220 in the laser interferometer to move in a predetermined direction. The length-measurement controller 600 may be a general-purpose computer such as a personal computer, or may be a dedicated control device.

Though the specific arrangement of the length-measurement controller 600 is not illustrated, the length-measurement controller 600 includes: a CPU (Central Processing Unit) for controlling the whole instrument; an input and output unit such as a keyboard and mouse by which a user can perform input operation; and a storage such as a memory for temporarily storing data calculated by the CPU and an HDD for storing various data and programs.

As shown in FIG. 4, the storage of the length-measurement controller 600 stores: an environmental factor reader 610; a refractive index computer 620; an environmental factor constant computer 630; an interference signal reader 640; a sum signal computer 650; a displacement controller 660; a reference displacement controller 670; a measurement displacement controller 680, as various programs to be processed by the CPU. The above units are stored as the programs and processed by the CPU in this exemplary embodiment, but the units are not limited thereto. For example, the units may be an integrated circuit such as an IC chip.

The environmental factor reader 610 reads measurement data (temperature data, atmospheric pressure data, humidity data, $CO_2$ concentration data) inputted from the environmental monitor 500. The environmental factor reader 610 writes the measurement data in the memory to temporarily store the data so that the data can be processed by the CPU.

The refractive index computer 620 calculates an air refractive index $n_1$ of the long-wavelength laser beam (1064 nm) and an air refractive index $n_2$ of the short-wavelength laser beam (532 nm) using the measurement data of the environmental factors read from the environmental factor reader 610. The refractive index computer 620 calculates the air refractive indexes $n_1$ and $n_2$ from the measurement data based on the formula of Ciddor (see: P. E. Ciddor, "Refractive index of air; new equations for visible and near infrared," Appl. Opt. 35, 1566-1573 (1996)).

The environmental factor constant computer 630 calculates an environmental factor constant K using the air refractive indexes $n_1$ and $n_2$ calculated by the refractive index computer 620 based on the above formula (10).

The interference signal reader 640 reads interference signals corresponding to the laser beams of the different wavelengths outputted from the laser interferometer 100. The interference signal reader 640 writes the interference signals of interference waves in the memory to temporarily store the signals so that the signals can be processed by the CPU.

The sum signal computer 650 calculates a sum signal of the interference signal corresponding to the long-wavelength laser beam and the interference signal corresponding to the short-wavelength laser beam based on the read interference signals. The sum signal computer 650 calculates interference signals $y_1$ and $y_2$ and a sum signal of the interference signals $y_1+y_2$ based on the above-described formulae (1), (2) and (4).

The displacement controller 660 controls the drive of the driver provided on the reference corner cube 220 to displace the reference corner cube 220 along the reference optical path 200.

At this time, the displacement controller 660 displaces the reference corner cube 220 so that the sum signal $y_1+y_2$ calculated by the sum signal computer 650 crosses a zero-cross point.

The reference displacement computer 670 calculates a displacement of the reference corner cube 220 when the reference corner cube 220 is moved by the displacement controller 660. At this time, the reference displacement computer 670 calculates a displacement l of the reference corner cube 220 based on the interference signal $y_1$ corresponding to the long-wavelength laser beam that is not affected by the displacement of the measurement corner cube 340. Specifically, the air refractive index $n_1$ of the long-wavelength laser beam calculated by the refractive index computer 620 and the interference signal $y_1$ of the long-wavelength laser beam read by the interference signal reader 640 are assigned to the above formula (1) to calculate the displacement l of the reference corner cube 220.

The measurement displacement computer 680 calculates a displacement of the measurement corner cube 340 based on the above-described formula (11) from the displacement l of the reference corner cube 220 and the environmental factor constant K calculated by the environmental factor constant computer 630.

Displacement Measurement Principle of Laser Interferometric Measuring Instrument Next, the measurement principle for measuring a displacement of the target object 3 by the above-described laser interferometric measuring instrument will be described below.

In the laser interferometer 100 as described above, when the long-wavelength laser beam having 1064 nm wavelength and the short-wavelength laser beam having 532 nm wavelength are emitted from the light source 110, the phase detector 420 receives these two laser beams having different wavelengths through an optical path as described below.

The laser beams of the different wavelengths are split by the polarizing beam splitter 120 depending on their polarizing directions. Specifically, the laser beams of the S-polarized light are irradiated to the reference optical path 200 and the laser beams of the P-polarized light are irradiated to the measurement optical path 300.

The long-wavelength laser beam irradiated to the reference optical path 200 is reciprocated twice between the polarizing beam splitter 120 and the reference corner cube 220, and the short-wavelength laser beam irradiated to the reference optical path 200 is reciprocated once between the polarizing beam splitter 120 and the reference corner cube 220. On the other hand, the long-wavelength laser beam irradiated to the measurement optical path 300 is reciprocated twice between the polarizing beam splitter 120 and the long-wavelength corner cube 330, and the short-wavelength laser beam irradiated to the measurement optical path 300 is reciprocated once between the polarizing beam splitter 120 and the measurement corner cube 340. The respective laser beams are combined by the polarizing beam splitter 120 and irradiated to the interference length measuring optical path 400 to be received by the phase detector 420. The phase detector 420 generates interference signals corresponding to interference waves by photoelectric conversion and outputs the interference signal to the length-measurement controller 600.

Figure 1:
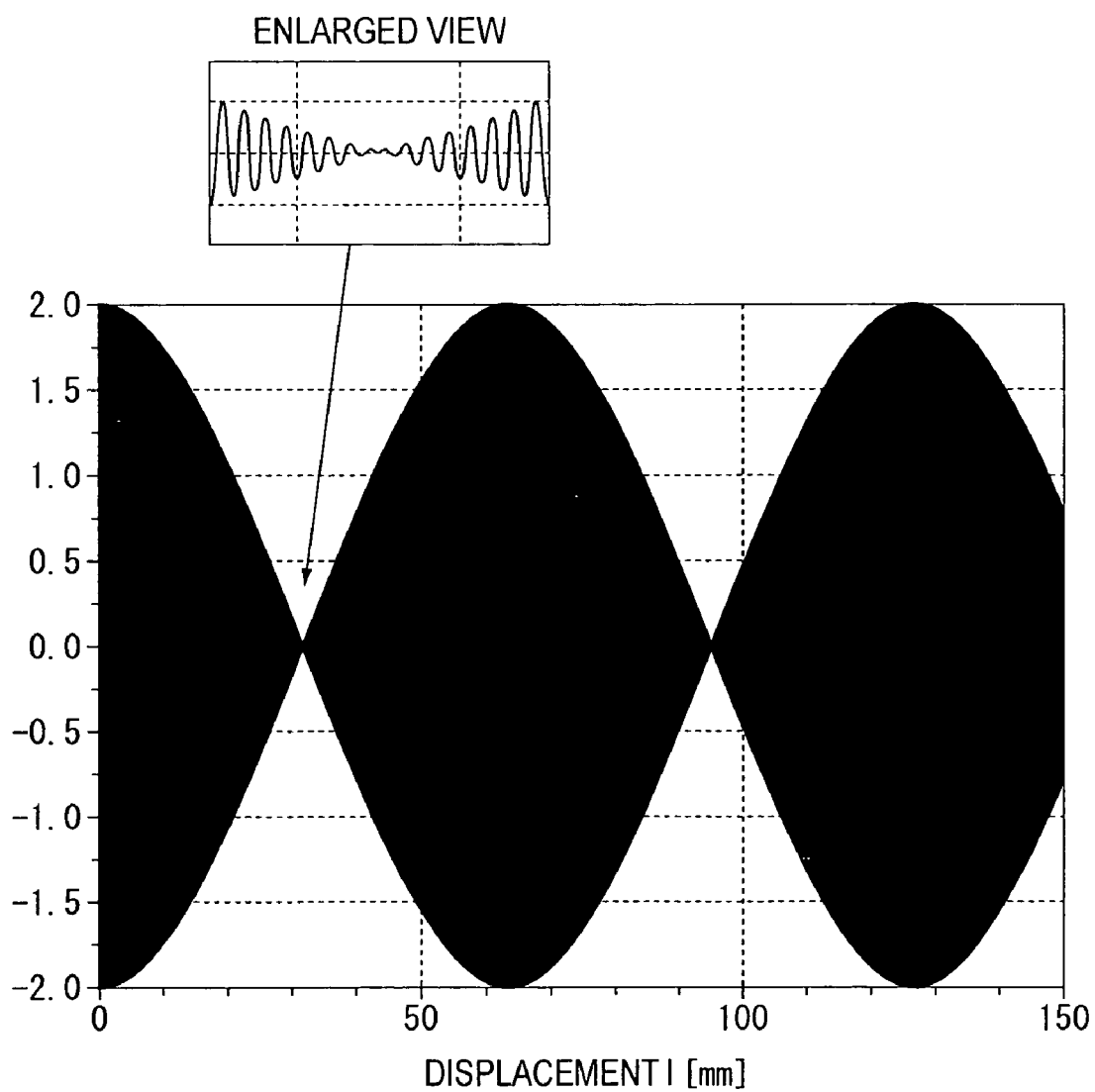
FIG. 1 shows a variation of a sum signal depending on a displacement of a reference reflector.
Figure 2:
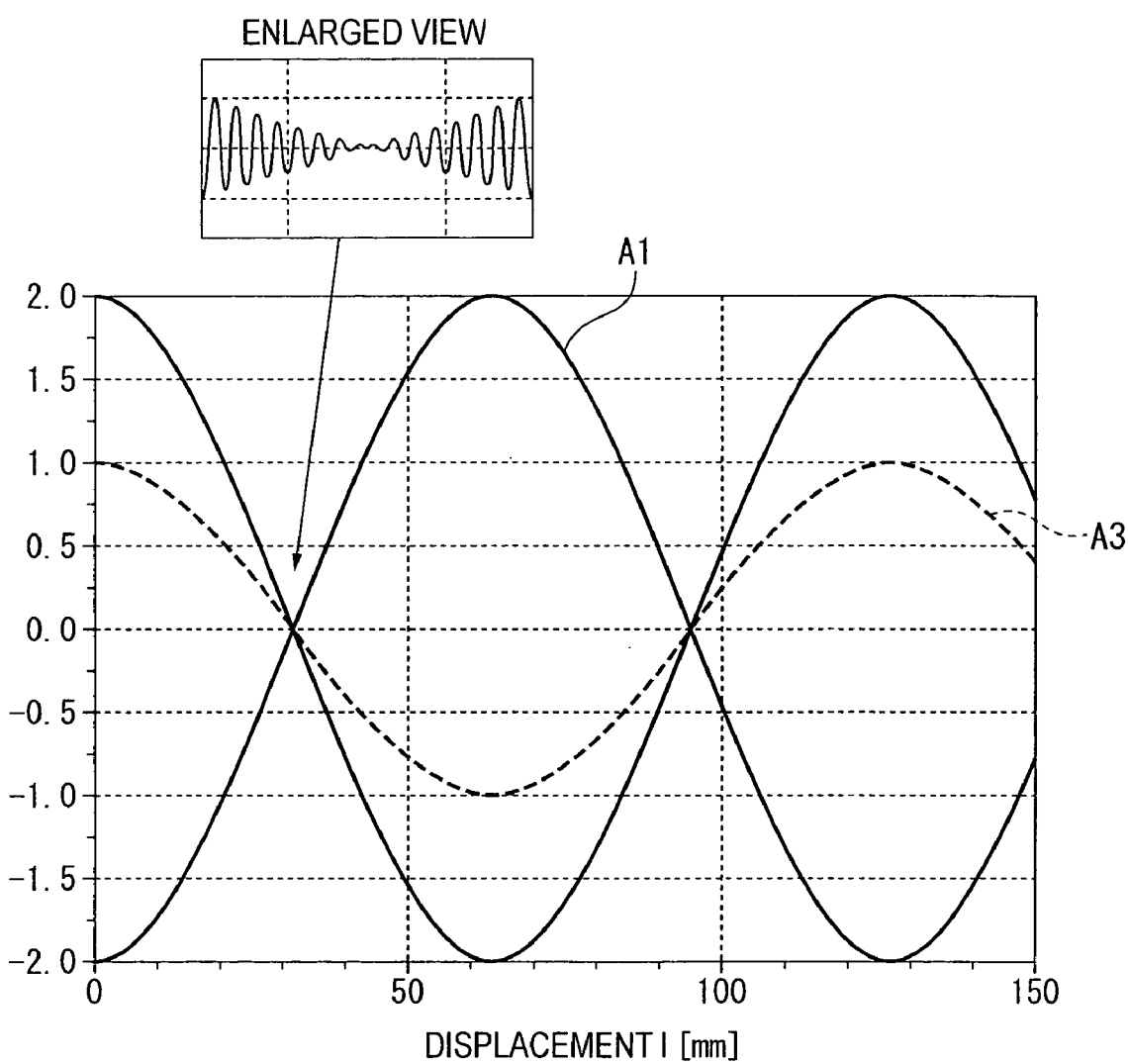
FIG. 2 is an illustration in which a signal component that fluctuates at high speed as shown in FIG. 1 is omitted.

When the reference corner cube 220 is displaced by the displacement l, the wavelength of the long-wavelength laser beam is twice as long as that of the short-wavelength laser beam. Thus, the interference signals $y_1$ and $y_2$ are represented by the above-described formulae (1) and (2). The sum signal $y_1+y_2$ of the interference signals is represented by the formula (4). As shown in FIG. 1, when the displacement l is $l_T$, one cycle of a form component signal that is a curve line connecting crests of the sum signal $y_1+y_2$ is equivalent to a half cycle of a long cycle $\cos(2\pi l(n_1-n_2)/\lambda_2)$. Accordingly, the formulae (5) an (6) are provided.

Figure 3:
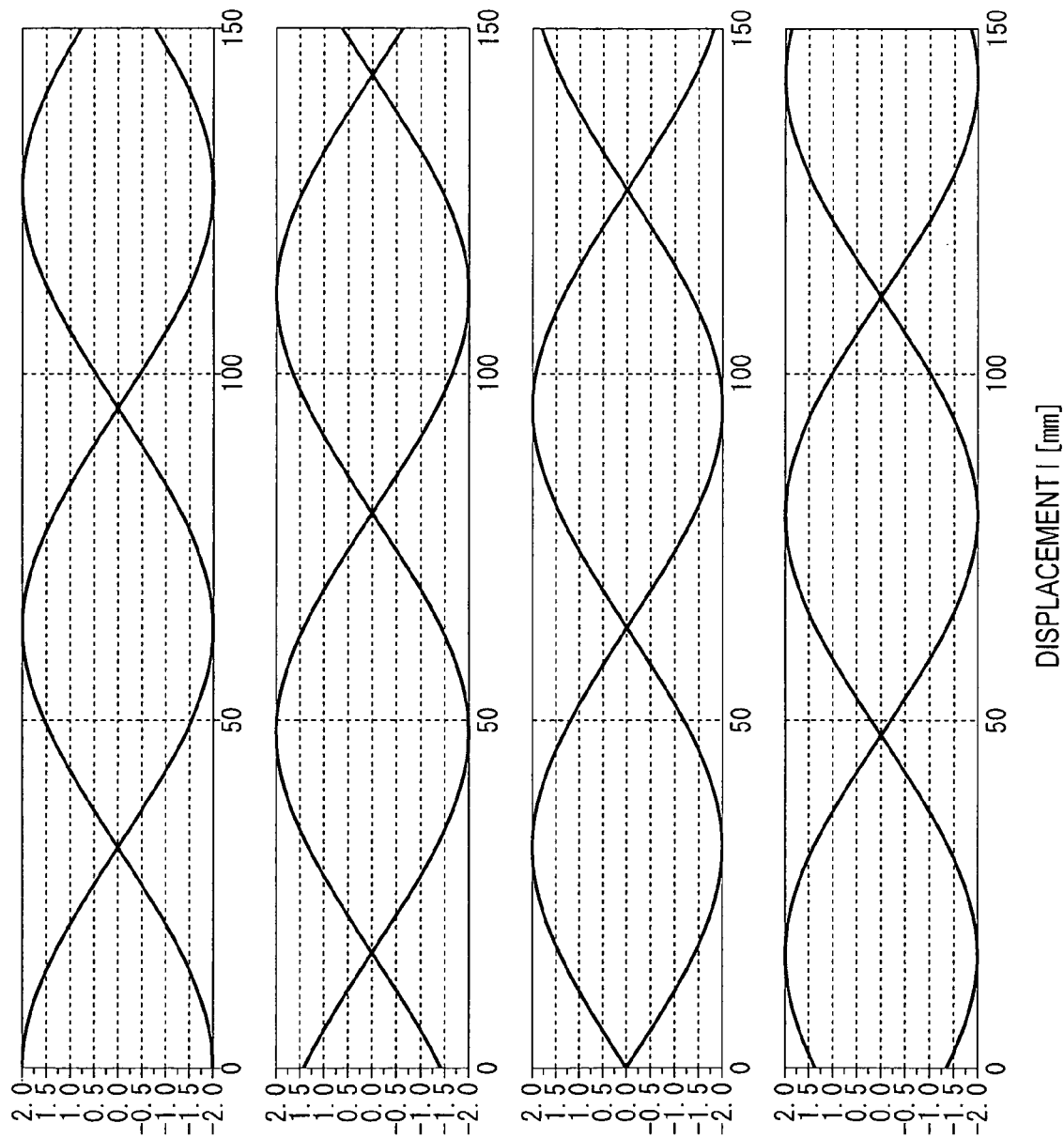
FIG. 3 shows a variation of the sum signal depending on a displacement of a measurement reflector.

On the other hand, when the displacement of the measurement corner cube 340 is denoted by D, the interference signal $y_2$ of the short-wavelength laser beam is represented by the formula (7). As shown in FIG. 3, a cycle of the interference signal $y_2$ is $2\pi$. When the displacement D in this case is denoted by $D_T$, the formula (9) is established.

Further, the displacement of the sum signal $y_1+y_2$ when the reference corner cube 220 in the reference optical path 200 is displaced by $l_T$ is the same as when the measurement corner cube 340 in the measurement optical path 300 is displacement by $D_T$. Thus, when a ratio of the displacements $l_T$ and $D_T$ is defined as an environmental factor constant K, K is represented by the formula (10) and therefore the formula (11) is deduced.

The environmental factor constant K is calculated by the air refractive indexes $n_1$ and $n_2$ of the laser beams as represented by the formula (10). The air refractive indexes $n_1$ and $n_2$ are obtained by the formula of Ciddor based on the environmental factors (temperature, atmospheric pressure, humidity, $CO_2$ concentration).

Figure 7:
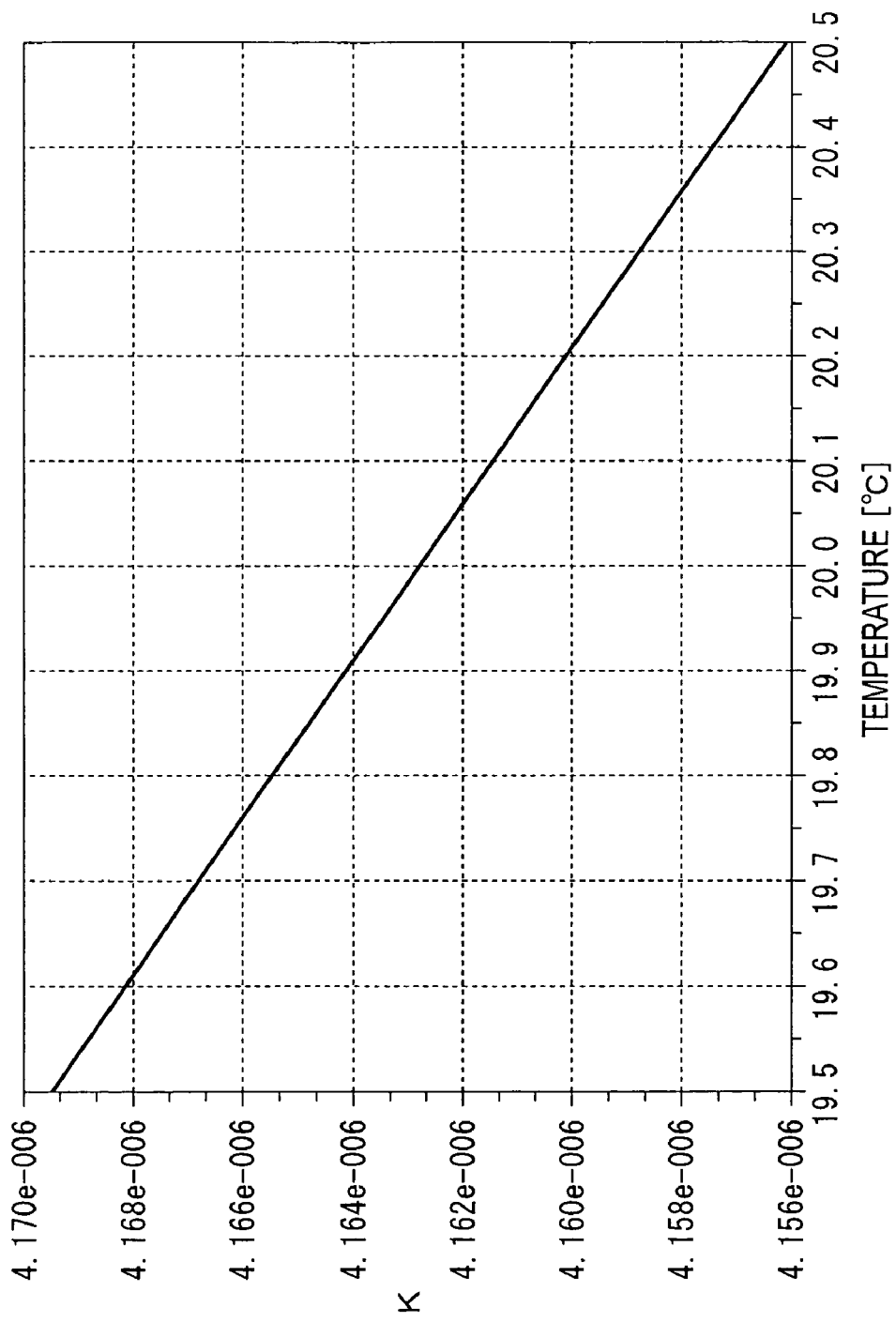
FIG. 7 shows a variation of an environmental factor constant K when temperature is varied in the variation range shown in FIG. 6 and atmospheric pressure, humidity and $CO_2$ concentration are kept at standard values shown in FIG. 6.
Figure 8:
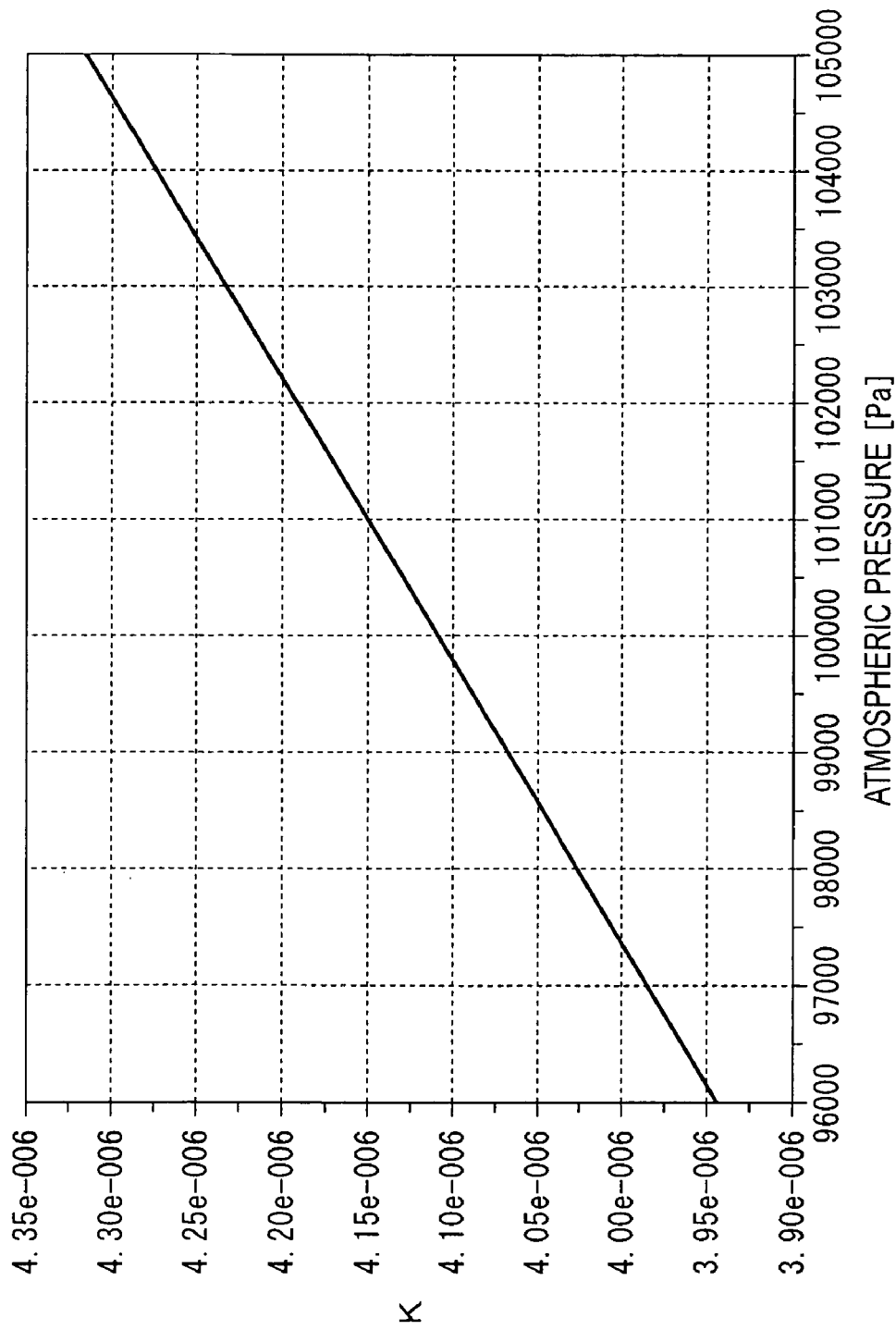
FIG. 8 shows a variation of the environmental factor constant K when the atmospheric pressure is varied in the variation range shown in FIG. 6 and the temperature, humidity and $CO_2$ concentration are kept at the standard values shown in FIG. 6.
Figure 9:
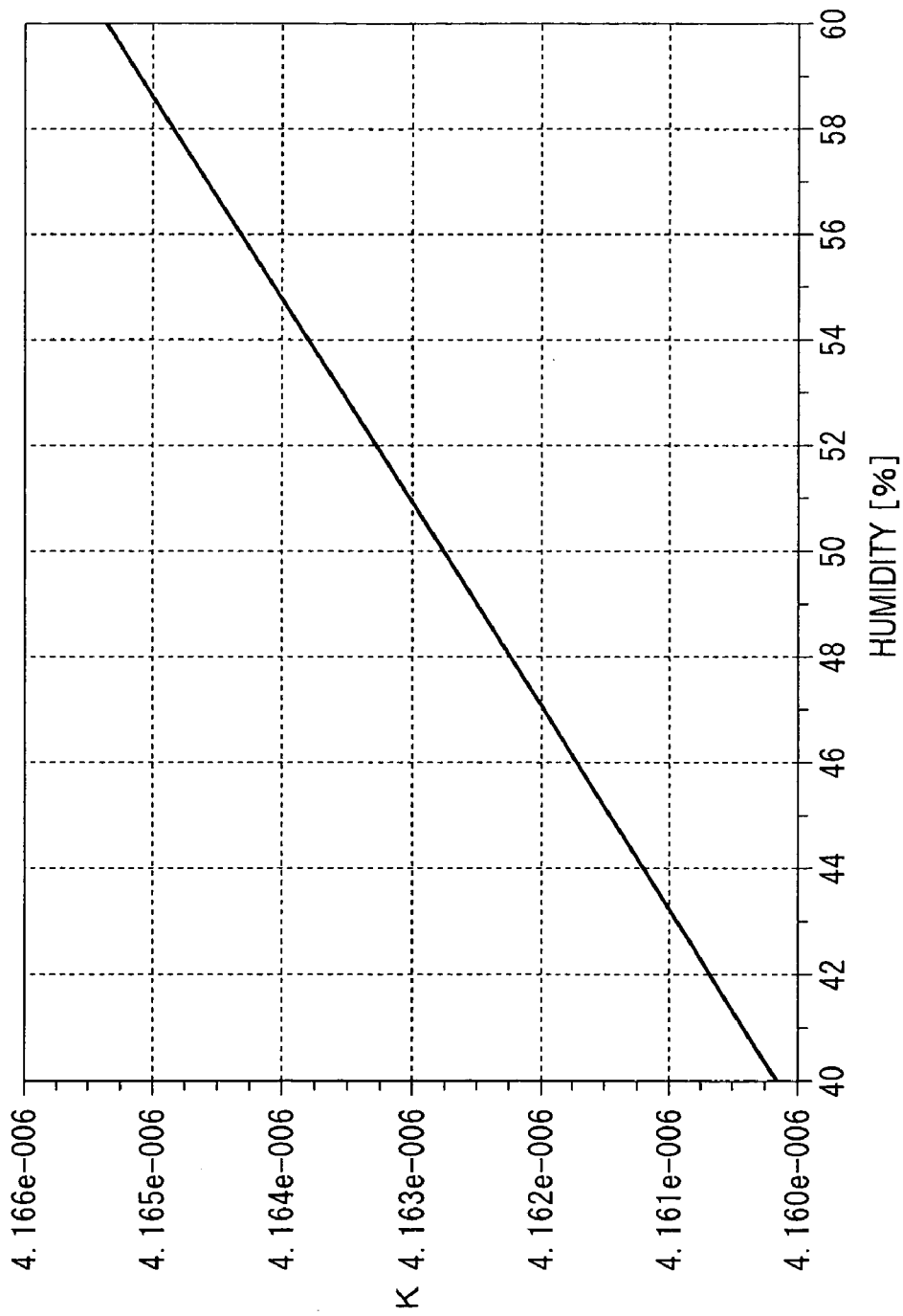
FIG. 9 shows a variation of the environmental factor constant K when the humidity is varied in the variation range shown in FIG. 6 and the temperature, atmospheric pressure and $CO_2$ concentration are kept at the standard values shown in FIG. 6.
Figure 10:
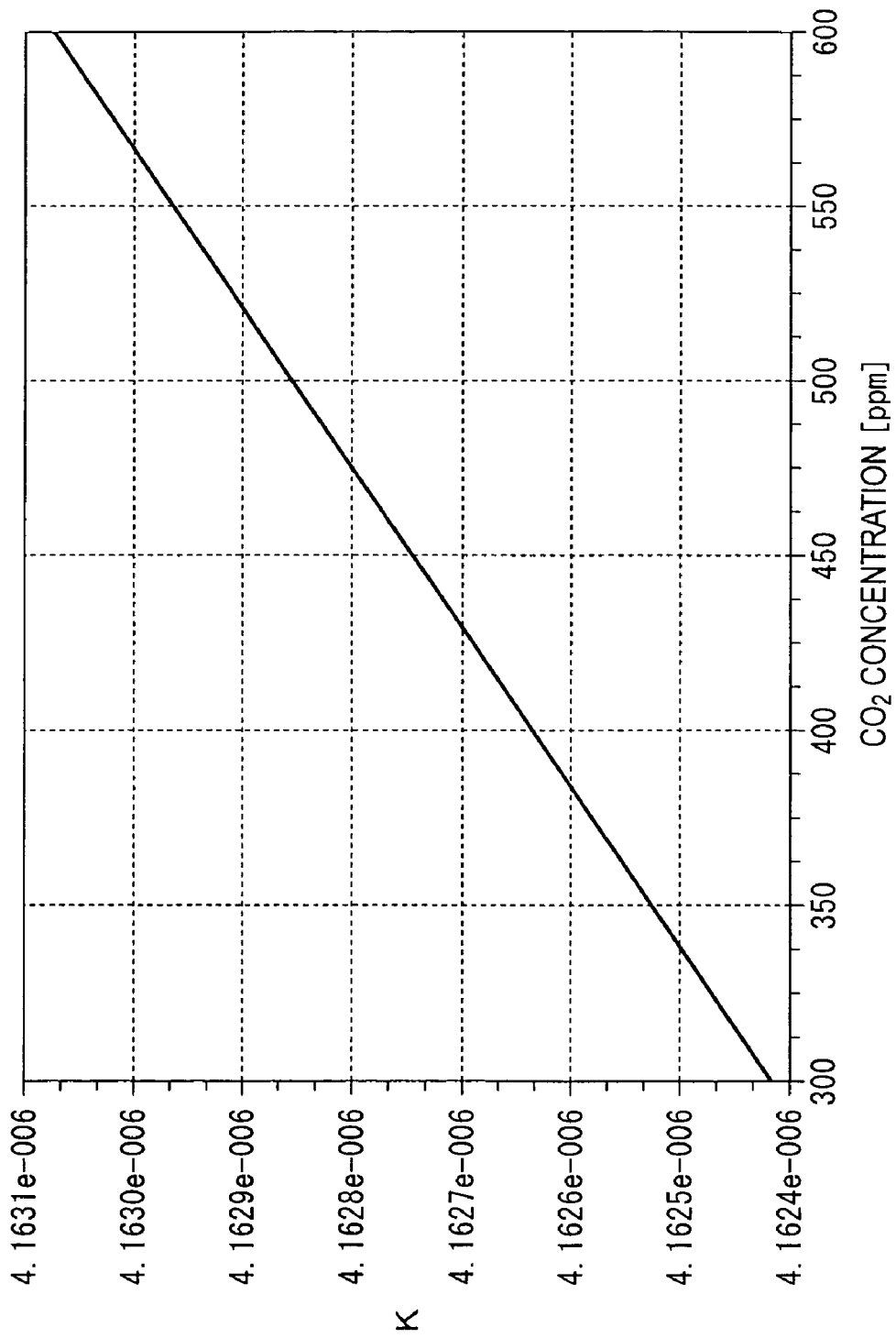
FIG. 10 shows a variation of the environmental factor constant K when the $CO_2$ concentration is varied in the variation range shown in FIG. 6 and the temperature, atmospheric pressure and humidity are kept at the standard values shown in FIG. 6.

Here, standard values of the environmental factors are determined as shown in FIG. 6. FIG. 7 shows a variation of the environmental factor constant K when the temperature is varied in the variation range shown in FIG. 6 and the atmospheric pressure, humidity and $CO_2$ concentration are kept at the standard values shown in FIG. 6. FIG. 8 shows a variation of the environmental factor constant K when the atmospheric pressure is varied in the variation range shown in FIG. 6 and the temperature, humidity and $CO_2$ concentration are kept at the standard values shown in FIG. 6. FIG. 9 shows a variation of the environmental factor constant K when the humidity is varied in the variation range shown in FIG. 6 and the temperature, atmospheric pressure and $CO_2$ concentration are kept at the standard values shown in FIG. 6. FIG. 10 shows a variation of the environmental factor constant K when the $CO_2$ concentration is varied in the variation range shown in FIG. 6 and the temperature, atmospheric pressure and humidity are kept at the standard values shown in FIG. 6.

As shown in FIGS. 7 to 10, because K is approximately $4.2 \times 10^{-6}$ and the air refractive index $n_2$ is nearly equal to $n_1$ and is nearly equal to 1, $n_2 - n_1$ is also $4.2 \times 10^{-6}$.

Accordingly, the environmental factor constant K is sufficiently smaller than 1. Thus, the displacement D of the measurement corner cube 340 can be accurately measured by measuring the displacement l of the reference corner cube 220 based on the formula (11).

Displacement Measuring Method Using Laser Interferometric Measuring Instrument

Next, a measuring method for measuring the displacement D of the target object using the above-described laser interferometric measuring instrument 1 will be described below.

Figure 11:
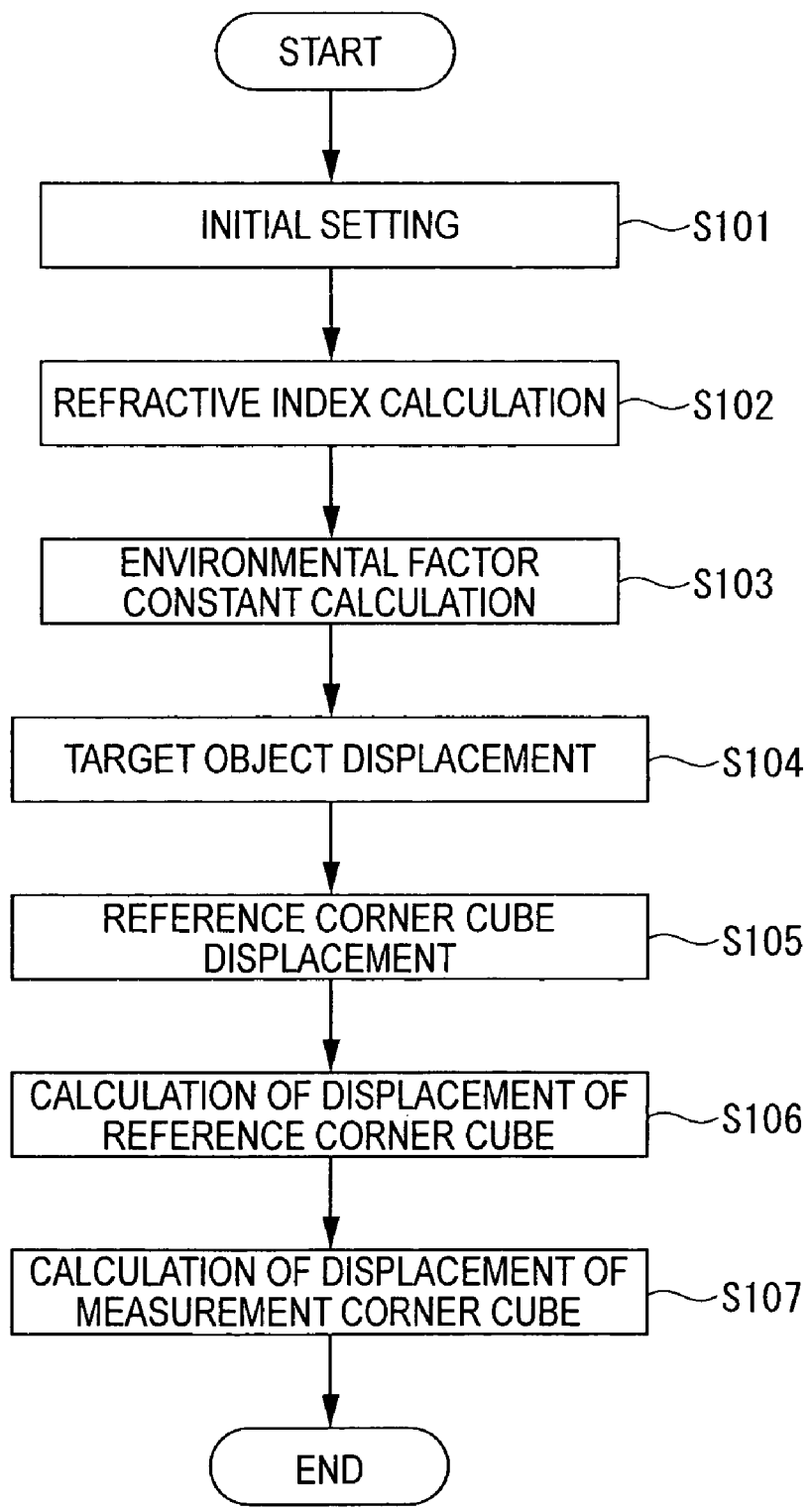
FIG. 11 is a flowchart of a displacement measuring method using the laser interferometric measuring instrument.

FIG. 11 is a flowchart of a displacement measuring method using the laser interferometric measuring instrument 1. As shown in FIG. 11, in the displacement measuring method using the laser interferometric measuring instrument 1, the reference corner cube 220 is displaced as an initial setting so that the sum signal $y_1+y_2$ of the interference signals of the laser beams becomes coincident with the zero-cross point. For this purpose, the interference signal reader 640 of the length-measurement controller 600 reads the interference signals $y_1$ and $y_2$ of the laser beams, and the sum signal computer 650 calculates the sum signal $y_1+y_2$ that is the combined signal of the interference signals $y_1$ and $y_2$. Then, the displacement controller 660 of the length-measurement controller 600 displaces the reference corner cube 220 by driving the driver with reference to the sum signal $y_1+y_2$. When the sum signal $y_1+y_2$ crosses the zero-cross point, the movement of the reference corner cube 220 is stopped (step S101).

Further, the environmental factor reader 610 of the length-measurement controller 600 reads the measurement data of the environmental factors inputted from the environmental monitor 500, and the refractive index computer 620 calculates the air refractive indexes $n_1$ and $n_2$ of the laser beams from the measurement data based on the Ciddor's formula (step S102). Furthermore, the environmental factor constant computer 630 of the length-measurement controller 600 calculates the environmental factor constant K from the air refractive indexes $n_1$ and $n_2$ based on the formula (10) (step S103). Incidentally, the calculated environmental factor constant K is slightly varied depending on the environmental factors, but is approximately $4.2 \times 10^{-6}$ as shown in FIGS. 7 and 10.

Then, the measurement corner cube 340 to which the target object 3 is fixed is displaced (step S104).

At this time, the sum signal $y_1+y_2$ is varied because the interference signal $y_2$ is varied due to the displacement of the measurement corner cube 340. Accordingly, the reference corner cube 220 is displaced to counteract the variation of the sum signal. In other words, the displacement controller 660 of the length-measurement controller 600 displaces the reference corner cube 220 so that the sum signal $y_1+y_2$ calculated by the sum signal computer 650 always crosses the zero-cross point (step S105).

The reference displacement computer 670 calculates a displacement of the reference corner cube 220 from the initial position of the reference corner cube 220 set in the step S101 based on the variation of the interference signal $y_1$ (step S106). At this time, the reference displacement computer 670 calculates the displacement l based on the formula (1) using the air refractive index $n_1$ of the long-wavelength laser beam calculated in the step S102 and the interference signal $y_1$ of the long-wavelength laser beam read by the interference signal reader 640.

Then, the measurement displacement computer 680 of the length-measurement controller 600 calculates the displacement D of the measurement corner cube 340 based on the formula (11) using the environmental factor constant K calculated in the step S103 and the displacement l calculated in the step S106.

Uncertainty Analysis

Next, uncertainty analysis in the above-described displacement measuring method is described below.

The above-described formula (11) is differentiated to obtain the following formula.

$$\delta D = \delta(Kl) = \delta K l + K \delta l \quad (12)$$

In the first term of the above formula (12), $\delta K$ represents the uncertainty of the environmental factor constant K and $\delta l$ represents the uncertainty of the displacement l of the reference corner cube 220.

Based on the results shown in FIGS. 7 and 10, the uncertainty $\delta K$ of the environmental factor constant K is nearly equal to $2.0 \times 10^{-9}$ when the temperature is 0.1° C., the atmospheric pressure is 1 hPa and the humidity is 3%. These measurement values have accuracy capable of being easily measured by a commonly-available thermometer, barometer and hygrometer. The uncertainty $\delta K$ of the environmental factor constant K measured by these commonly-available measuring instruments is sufficiently small. Incidentally, the effect of the $CO_2$ concentration is sufficiently small as compared to the other measurement environmental factors and the uncertainty $\delta K$ of the environmental factor constant K due to the variation of the $CO_2$ concentration is smaller than the above value. Thus, the $CO_2$ concentration is not always necessary to be measured.

For example, when the uncertainty $\delta K$ of the environmental factor constant K is $2.0 \times 10^{-9}$ and the displacement l of the reference corner cube 220 is 63.33 mm, $\delta Kl$ is nearly equal to 0.1266 nm. Also, the displacement l can be obtained from the displacement D equal to 266 nm of the measurement corner cube 340 and the environmental factor constant K in the measurement system of the above laser interferometric measuring instrument. Thus, the displacement D of the measurement corner cube 340 can be measured with accuracy of 0.1266 μm.

As described above, the displacement l of the reference corner cube 220 is obtained by the formula (1) based on the interference signal corresponding to the long-wavelength laser beam of 1064 μm. Accordingly, the measurement accuracy δl of the displacement l in micrometers can be easily assured. When the environmental factor constant K is nearly equal to $4.2 \times 10^{-6}$ and the measurement accuracy δl of the displacement l of the reference corner cube 220 is 10 μm in the second term of the above formula (12), δKl is nearly equal to $4.2 \times 10^{-11}$. Thus, the uncertainty of δKl in the second term is extremely small.

As described above, the change of the environmental factor constant K due to the environmental factors is sufficiently small in practice, and the uncertainty of the measurement value of the displacement l of the reference corner cube 220 is reduced. Thus, using the formula (11), the displacement D of the measurement corner cube 340 can be accurately measured.

Advantages of Laser Interferometric Measuring Instrument

In the laser interferometric measuring instrument 1 as described above, the light source 110 of the laser interferometer 100 emits the two laser beams of different wavelengths having a multiple relationship, i.e., the long-wavelength laser beam of 1064 nm and the short-wavelength laser beam of 532 nm. Then, the polarizing beam splitter 120 splits the laser beams into the reference optical path 200 and measurement optical path 300 depending on the polarizing directions. The reference corner cube 220 displaceable along the optical axis is provided in the reference optical path 200, and the measurement corner cube 340 to which the target object is fixed and which is displaceable along the optical axis is provided in the measurement optical path 300. Also, the optical path length changing corner cube 130 is provided facing the end surface of the polarizing beam splitter 120 opposite to the reference optical path 200. The quarter-wave plate 210 is provided in the reference optical path 200. The quarter-wave plate 210 works only on the long-wavelength laser beam and reciprocates twice the long-wavelength laser beam between the polarizing beam splitter 120 and the reference corner cube 220 to change the optical path length. In the measurement optical path 300, the quarter-wave plate 310 that works only on the long-wavelength laser beam; the dichroic mirror 320 that reflects only the long-wavelength laser beam to guide the long-wavelength laser beam toward the long-wavelength corner cube 330; and the long-wavelength corner cube 330 are provided. These optical components and the optical path length changing corner cube 130 reciprocate twice the long-wavelength laser beam irradiated to the measurement optical path 300 between the polarizing beam splitter 120 and the long-wavelength corner cube 330, thereby changing the optical path length. Then, the polarizing beam splitter 120 combines the laser beams having different wavelengths incident from the reference optical path 200 and the measurement optical path 300 to provide the interference waves. The phase detector 420 of the interference length measuring optical path 400 detects the interference signals of the interference waves and outputs the signals to the length-measurement controller 600. The length-measurement controller 600 includes: the sum signal computer 350 for calculating the sum signal $y_1 + y_2$ obtained by combining the interference signals $y_1$ and $y_2$ corresponding to the detected laser beams having the different wavelengths; and the displacement controller 660 for displacing the reference corner cube 220 so that the sum signal $y_1 + y_2$ becomes coincident with the zero-cross point. Then, the reference displacement computer 670 of the length-measurement controller 600 calculates the displacement of the reference corner cube 220 displaced by the displacement controller 660, and the measurement displacement computer 680 calculates the displacement D of the measurement corner cube 340 based on the calculated displacement of the reference corner cube 220.

According to the laser interference measuring method using the laser interferometric measuring instrument, the sum signal $y_1 + y_2$ of the detected interference signals $y_1$ and $y_2$ is calculated and the reference corner cube 220 is displaced so that the sum signal $y_1 + y_2$ crosses the zero-cross point as described above. Based on this displacement of the reference corner cube 220, the displacement of the measurement corner cube 340 is calculated.

Using the laser interferometric measuring instrument and the laser interference measuring method as described above, the displacement of the measurement corner cube 340 can be obtained based on the formula (11). In other words, the displacement D of the measurement corner cube 340 can be obtained by multiplying the environmental factor constant K that is sufficiently smaller than 1 by the displacement l of the reference corner cube 220. Here, the environmental factor constant K is approximately $4.2 \times 10^{-6}$ in air. Accordingly, for example, the displacement D of the measurement corner cube 340 can be calculated in picometers by measuring the displacement l of the reference corner cube 220 in, for example, micrometers. Further, alignment can be set at any position in the laser interferometer and the displacement can be measured in a narrow range.

Thus, compared to the measurement using a short-wavelength laser beam having relatively short wavelength such as a short-wavelength laser beam in a range except a visible range or an X-ray, safety can be ensured and the arrangement of the entire instrument can be simplified, which leads to downsizing of the laser interferometric measuring instrument and cost reduction. Since only relatively simple optical paths are provided without doubling the optical lengths by reciprocating laser beams plural times in a complicated optical system, the optical system of the exemplary embodiment is not complicated and the arrangement is simplified, so that the stable measurement can be conducted while preventing the reduction in light quantity of the laser beams. Further, since it is not required to use a variable laser beam, the laser beam of a predetermined wavelength can be stably supplied without the effect of dispersion of the laser beam. Consequently, the laser interferometric measuring instrument 1 and the displacement measuring method for accurately measuring the displacement with the simple arrangement while sufficiently ensuring the stability and safety can be provided.

The reference displacement computer 670 calculates the displacement l of the reference corner cube 220 based on the formula (1) using the interference signal $y_1$ of the long-wavelength laser beam read by the interference signal reader 640 and the air refractive index $n_1$ of the long-wavelength laser beam calculated by the refractive index computer 620 based on the measurement data of the environmental factors outputted from the environmental monitor 500.

Thus, by calculating the displacement of the reference corner cube 220 from the interference signal of the long-wavelength laser beam, the displacement l can be calculated more accurately compared to, for example, the measurement by reading a graticule provided along the displacement direction of the reference corner cube 220. Specifically, by calculating the displacement of the reference corner cube 220 in micrometers, which can be easily achieved as described above, the displacement of the measurement corner cube 340 can be measured more accurately, for example, in picometers.

The laser interferometer 100 includes: the measurement corner cube 340 as the measurement reflector; the reference corner cube 220 as the reference reflector; the long-wavelength corner cube 330 as the long-wavelength reflector; and the optical path length changing corner cube 130 as a part of the measurement optical path length changing unit and reference optical path length changing unit. Accordingly, the optical path of the laser beam irradiated to the interference length measuring optical path 400 from the polarizing beam splitter 120 is provided in parallel with the optical path of the laser beam incident on the polarizing beam splitter 120 from the light source 110 so that the laser beam incident on the polarizing beam splitter 120 form the light source 110 is not superposed. In other words, the laser beams of different wavelengths are split into the measurement optical path 300 and the reference optical path 200 at the point B in the polarizing beam splitter 120 and combined at the point A, which is different from the point B, in the polarizing beam splitter 120 to enter the interference length measuring optical path 400. With this arrangement as described above, the plane mirror 410 is disposed only in the interference length measuring optical path 400 and thus the laser beams in the optical path from the light source 110 to the polarizing beam splitter 120 is not interfered. Incidentally, optical components that transmit incident light from one side and reflect incident light from the other side may be used. However, when such optical components are used, the laser beams irradiating from the polarizing beam splitter 120 to the interference length measuring optical path 400 may enter a laser light source of the light source, so that the laser light source may unstably oscillate and may not emit laser beams stably. Also, a part of the laser beams emitted from the light source 110 may be reflected by the optical components and may be incident on the phase detector 420, thereby preventing the accurate measurement. However, with the arrangement as described above, only the laser beams combined by the polarizing beam splitter 120 can be incident on the phase detector 420, thereby performing the measurement more accurately.

Modification of Exemplary Embodiment(s)

The invention is not limited to the above-described exemplary embodiment, but includes the following modifications as long as an object of the invention can be achieved.

For example, the reference corner cube 220 is displaced so that the sum signal $y_1+y_2$ crosses the zero-cross point to coincide the cycle of the sum signal $y_1+y_2$ with the cycle of the interference signals $y_2$ of the short-wavelength laser beam in the exemplary embodiment, but the invention is not limited thereto. It is only required that the reference corner cube 220 is displaced so that the phase of the sum signal $y_1+y_2$ does not vary when the displacement of the target object is measured. For example, a control point may be provided at a predetermined point other than the zero-cross point. More specifically, the control point may be set at a point where the amplitude of the sum signal $y_1+y_2$ is 1.0 and the reference corner cube 220 may be displaced so that the sum signal $y_1+y_2$ becomes 1.0 of the control point during the measurement initial state and the displacement control of the reference corner cube 220 in S105.

Though the laser interferometer 100 includes: the measurement corner cube 340 as the measurement reflector; the reference corner cube 220 as the reference reflector; the long-wavelength corner cube 330 as the long-wavelength reflector; and the optical path length changing corner cube 130 as a part of the measurement optical path length changing unit and reference optical path changing unit in the exemplary embodiment, the laser interferometer 100 is not limited thereto. For example, reflective mirrors each having a surface orthogonal to an optical path may be provided as reflectors for reflecting the laser beams. With such an arrangement, cost for parts can be reduced.

As described above, the light source 110 may be one laser light source that emits a long-wavelength laser beam of 1064 nm and emits a part of the laser beam as a short-wavelength laser beam of 532 nm using a wavelength converter. Alternatively, one laser light source may emit a laser beam of 532 nm and emit a part of the laser beam as a long-wavelength laser beam of 1064 nm into which the laser beam of 532 nm is converted by a wavelength converter. Further, a laser light source for emitting a laser beam of 1064 nm and a laser light source for emitting a laser beam of 532 nm may emit two kinds of laser beams.

Though the laser interferometric measuring instrument 1 is exemplarily described in the exemplary embodiment, the invention is not limited thereto. The displacement measuring instrument of the invention is usable as a laser interference length evaluating instrument for evaluating interpolation errors of a traditional laser interferometer. The displacement measuring instrument of the invention is also usable to evaluate or calibrate various displacement measuring instruments such as a displacement gauge and a digital scale. Further, the displacement measuring instrument of the invention is applicable for evaluating linearity of various minute displacing elements or evaluating minute deformation of substances. Furthermore, the displacement measuring instrument of the invention may be a sensor for a highly-accurate movement stage.

Though one interference signal is used for each wavelength in the exemplary embodiment, the phase detector 420 may be a four-phase phasemeter to determine the moving directions of the measurement corner cube 340 and reference corner cube 220 or to strengthen the interference signals. At this time, a two-phase sine-wave signal having a phase shifted by 90 degrees per every wavelength can be used, so that the measurement can be accurately conducted.

Though the environmental monitor 500 measures the environmental factors (temperature, atmospheric pressure, humidity, $CO_2$ concentration) in the exemplary embodiment, a commonly-available thermometer, barometer, hydrometer, and $CO_2$ concentration meter may measure the environmental factors. Even in such a case, the uncertainty δK of the environmental factor constant K is sufficiently small, so that the measurement can be accurately conducted. Though the measurement data of the environmental factors measured by the environmental monitor 500 is outputted to the length-measurement controller 600, a user may directly input the measurement data to the length-measurement controller 600. Also, a user may directly input the refraction indexes $n_1$ and $n_2$ of the laser beams and the environmental factor constant K.

Also, the long-wavelength laser beam is reciprocated twice between the polarizing beam splitter 120 and the long-wavelength corner cube 330 and is also reciprocated twice between the polarizing beam splitter 120 and the reference corner cube 220 using the quarter-wave plates 210 and 310 and the optical path length changing corner cube 130 as the measurement optical path length changing unit and reference optical path length changing unit, the long-wavelength laser beam may be reciprocated three times or more.

The specific arrangements and procedures for carrying out the invention may be changed in any manner as long as an object of the invention can be achieved.

What is claimed is:

1. A displacement measuring instrument, comprising:
a light source that emits two laser beams of different wavelengths having a multiple relationship;
a polarization splitter that splits the laser beams emitted from the light source depending on polarizing directions of the laser beams so that one of split laser beams is irradiated to a measurement optical path in a direction toward a target object and the other of the split laser beams is irradiated to a reference optical path in a direction different from the direction of the measurement optical path;

a measurement light splitter provided in the measurement optical path to reflect a long-wavelength laser beam and transmit a short-wavelength laser beam out of the two laser beams having different wavelengths;

a long-wavelength reflector provided in the measurement optical path to reflect the long-wavelength laser beam split by the measurement light splitter;

a measurement optical path length changing unit provided in the measurement optical path to change an optical path length of the long-wavelength laser beam;

a measurement reflector that is fixed to the target object and displaceable along the measurement optical path to reflect the short-wavelength laser beam;

a reference reflector that is displaceable in the reference optical path to reflect the laser beam;

a reference optical path length changing unit provided in the reference optical path to change the optical path length of the long-wavelength laser beam;

a light superposing unit that superposes the laser beams reflected by the measurement reflector and the long-wavelength reflector in the measurement optical path on the laser beam reflected by the reference reflector in the reference optical path;

a detector that receives interference waves generated from the laser beams superposed by the light superposing unit and outputs interference signals corresponding to the received interference waves;

a sum signal computer that calculates a sum signal of an interference signal corresponding to the long-wavelength laser beam and an interference signal corresponding to the short-wavelength laser beam out of the interference signals outputted from the detector;

a displacement controller that displaces the reference reflector so as not to change a phase of the sum signal;

a reference displacement detector that detects a displacement of the reference reflector; and a measurement displacement computer that calculates a displacement of the measurement reflector based on the displacement of the reference reflector.

2. The displacement measuring instrument according to claim 1, wherein the reference displacement detector detects the displacement of the reference reflector based on the interference signal corresponding to the long-wavelength laser beam.

3. A displacement measuring method used in a displacement measuring instrument including: a light source that emits two laser beams of different wavelengths having a multiple relationship; a polarization splitter that splits the laser beams emitted from the light source depending on polarizing directions of the laser beams so that one of split laser beams is irradiated to a measurement optical path in a direction toward a target object and the other of the split laser beams is irradiated to a reference optical path in a direction different from the direction of the measurement optical path; a measurement light splitter provided in the measurement optical path to reflect a long-wavelength laser beam and transmit a short-wavelength laser beam out of the two laser beams having different wavelengths; a long-wavelength reflector provided in the measurement optical path to reflect the long-wavelength laser beam split by the measurement light splitter; a measurement optical path length changing unit provided in the measurement optical path to change an optical path length of the long-wavelength laser beam; a measurement reflector that is fixed to the target object and displaceable along the measurement optical path to reflect the short-wavelength laser beam; a reference reflector that is displaceable in the reference optical path to reflect the laser beam; a reference optical path length changing unit provided in the reference optical path to change an optical path length of the long-wavelength laser beam; a light superposing unit that superposes the laser beams reflected by the measurement reflector and the long-wavelength reflector in the measurement optical path on the laser beam reflected by the reference reflector in the reference optical path; and a detector that receives interference waves generated from the laser beams superposed by the light superposing unit and outputs interference signals corresponding to the received interference waves, the displacement measuring method comprising:

calculating a sum signal of an interference signal corresponding to the long-wavelength laser beam and an interference signal corresponding to the short-wavelength laser beam out of the interference signals;

displacing the reference reflector so as not to change a phase of the sum signal;

detecting a displacement of the reference reflector; and calculating a displacement of the measurement reflector based on the displacement of the reference reflector.

* * * * *